US008474406B2

(12) United States Patent
Weinblatt

(10) Patent No.: US 8,474,406 B2
(45) Date of Patent: *Jul. 2, 2013

(54) DEVICE FOR KEEPING PETS' EARS CLEAN OR SUBSTANTIALLY CLEAN

(76) Inventor: Richard Weinblatt, Dresher, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/834,308

(22) Filed: Jul. 12, 2010

(65) Prior Publication Data

US 2010/0300365 A1     Dec. 2, 2010

Related U.S. Application Data

(63) Continuation of application No. 12/267,585, filed on Nov. 8, 2008, now Pat. No. 7,784,427, which is a continuation of application No. 11/745,344, filed on May 7, 2007, now Pat. No. 7,516,718, which is a continuation of application No. 11/052,151, filed on Feb. 7, 2005, now abandoned.

(60) Provisional application No. 60/547,877, filed on Feb. 26, 2004.

(51) Int. Cl.
*A01K 5/00* (2006.01)

(52) U.S. Cl.
USPC ........................................ 119/61.55; 119/61.5

(58) Field of Classification Search
USPC ............... 119/51.01, 61.5, 61.55, 72, 814, 119/815, 850, 851, 61.56, 51.5, 51.12, 52.4, 119/61; D30/144, 129, 121, 132, 133; 606/204.15; 128/864, 866, 845
See application file for complete search history.

(56) References Cited

U.S. PATENT DOCUMENTS

| 681,320 A | 8/1901 | Hood |
| 2,136,115 A | 11/1938 | McCaleb |
| 2,683,974 A | 7/1954 | Brown |
| 3,152,576 A | 10/1964 | Faurot |
| 3,257,990 A | 6/1966 | Robertson et al. |
| 4,085,706 A | 4/1978 | Evans |
| 4,233,942 A | 11/1980 | Williams |
| D300,278 S | 3/1989 | Morrell |
| 4,964,264 A | 10/1990 | Adams |
| 5,297,504 A | 3/1994 | Carrico |

(Continued)

FOREIGN PATENT DOCUMENTS

WO     2005/104826     11/2005

OTHER PUBLICATIONS

PETsMART, Inc., "Stainless Steel Spaniel Bowl," http://www.petsart.com/global/product_detail.jsp?PRODUCT%3C%3Eprd_id=845524441806364&ASSORTMENT%3C%3East_id=25343743023689&FOLDER%3C%3Efolder_id=2534374302025875&bmUID=1107799235183 (last accessed Feb. 7, 2005).

(Continued)

*Primary Examiner* — T. Nguyen

(57) ABSTRACT

An ear prop prevents a pet's ears from contacting or substantially contacting food or water in a bowl or dish. The ear prop has members for elevating, supporting or displacing the pet's ears, and the ear prop may comprise a shield. A dish for holding food or water for a pet is constructed to keep the pet's ears from contacting or substantially contacting food or water in the dish. The dish comprises a bowl section and an ear prop section. The bowl section has a floor piece with a boundary continuously connectable to a boundary of a side wherein another boundary of the side defines an opening of the dish. The ear prop section is operably connected to the opening to provide a mechanism for elevating, supporting or displacing the pet's ears.

33 Claims, 4 Drawing Sheets

U.S. PATENT DOCUMENTS

| | | |
|---|---|---|
| 5,626,258 A | 5/1997 | Maiorino |
| 5,724,914 A | 3/1998 | Nemeth |
| 5,967,363 A | 10/1999 | Allen |
| 5,975,016 A | 11/1999 | Wesenhagen |
| 6,032,824 A | 3/2000 | Barrow |
| 6,142,101 A | 11/2000 | Pelsor |
| 6,314,961 B1 | 11/2001 | Barnes |
| D467,044 S | 12/2002 | Tangolics |
| D467,687 S | 12/2002 | Tangolics |
| 6,491,185 B1 | 12/2002 | Azzarello et al. |
| D472,021 S | 3/2003 | Northrop |
| 6,842,918 B2 | 1/2005 | Fung |
| 6,904,624 B2 | 6/2005 | Leung et al. |
| 2003/0230244 A1 | 12/2003 | Morrison |
| 2004/0194716 A1 | 10/2004 | Morrison |

OTHER PUBLICATIONS

Petdiscounters.com, "Clean Ears Bowl," http://www.petdiscounters.biz/dog/feeders/oa_clean_ears.html (last accessed Feb. 7, 2005).

Tailsbythelake.com, "Angled Dog Bowl for Floppy Ears," http://shop.store.yahoo.com/tailsbythebay/anddogboforfl.html (last accessed Feb. 23, 2004).

LittleRiverPetShop.com, "Waterhole Dish," http://www.pet-shop.net/html/bowl9.html (last accessed Feb. 7, 2005).

DEVICE FOR KEEPING PETS' EARS CLEAN OR SUBSTANTIALLY CLEAN

CROSS-REFERENCE TO RELATED APPLICATIONS

This application is a continuation of U.S. application Ser. No. 12/267,585, filed Nov. 8, 2008, which is a continuation of U.S. application Ser. No. 11/745,344, filed May 7, 2007, which is a continuation of U.S. application Ser. No. 11/052,151, filed Feb. 7, 2005, which claims the benefit of U.S. Provisional Application No. 60/547,877, filed Feb. 26, 2004, the entire disclosures of which are incorporated herein by reference.

TECHNICAL FIELD

This invention relates in general to the field of devices for feeding pets, more particularly, to a device for keeping pets' ears clean or substantially clean.

BACKGROUND

When animals or pets eat food or drink water, they mainly place their faces in the bowl or dish containing the food. For example, when dogs eat food or drink water, they place their snouts in the bowl or dish in order to obtain access to the food or water. Dogs that have floppy ears, i.e., ears that hang toward the ground instead of "cropped ears," often get their ears wet or food stuck in the hair of their ears when they place their faces in the bowls or dishes containing food or water.

There is thus a need for a device that keeps pets' ears clean or substantially clean.

SUMMARY

In accordance with one aspect of the present invention, an ear prop prevents a pet's ears from contacting or substantially contacting food or water in a bowl or dish.

In accordance with another aspect of the present invention, a dish for holding food or water for a pet is constructed to keep the pet's ears from contacting or substantially contacting food or water in the dish. The dish comprises a bowl section and an ear prop section. The bowl section has a floor piece with a boundary continuously connectable to a boundary of a side wherein another boundary of the side defines an opening of the dish. The ear prop section is operably connected to the opening to provide a mechanism for elevating, supporting or displacing the pet's ears.

In accordance with yet another aspect of the present invention, an ear prop for preventing a pet's ears from contacting or substantially contacting food or water in a bowl or dish comprises a shield. The shield has members for elevating, supporting or displacing the pet's ears.

It is to be understood that the foregoing general description and the detailed description are exemplary, but not restrictive of the invention.

DESCRIPTION OF DRAWINGS

In the drawings, which are discussed below, one or more preferred embodiments are illustrated, with the same reference numerals referring to the same pieces of the invention throughout the drawings. It is understood that the invention is not limited to the embodiments depicted in the drawings herein, but rather it is defined by the claims appended hereto and equivalent structures

DETAILED DESCRIPTION

While the specification concludes with claims particularly pointing out and distinctly claiming the subject matter that is regarded as the invention, the invention will now be further described by reference to the following detailed description of preferred embodiments taken in conjunction with the above-described accompanying drawings.

Figure 1:
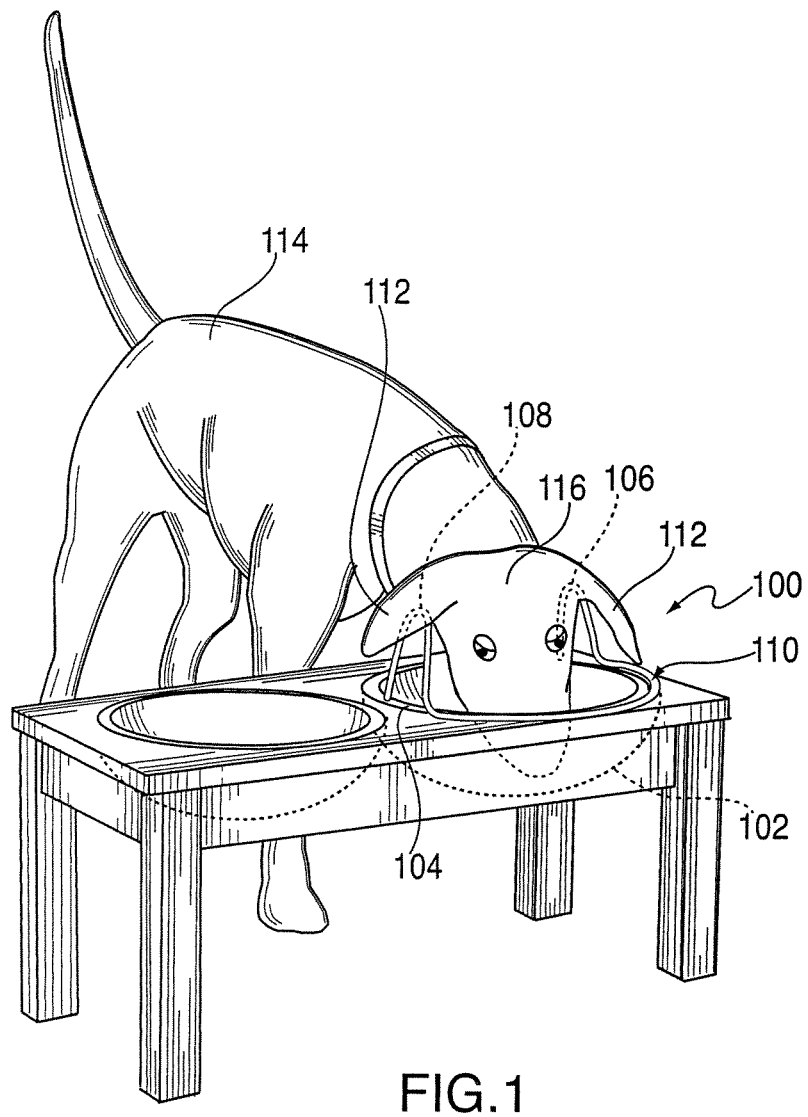
FIG. 1 is one embodiment of the ear prop of the present invention operably connected to a bowl.
Figure 4:
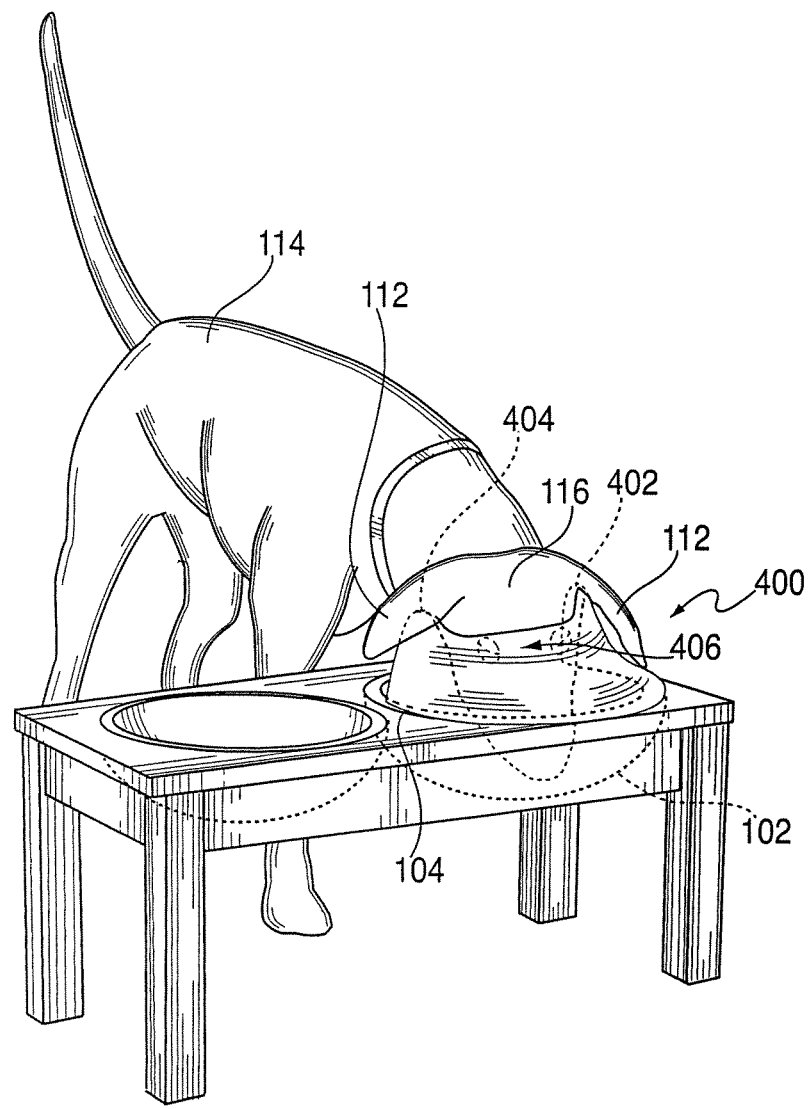
FIG. 4 is a fourth embodiment of the ear prop of the present invention operably connected to a bowl.

As shown in FIGS. 1 and 4, an ear prop 100, 400 is operably connected to a bowl 102. The ear prop 100, 400 can be either incorporated into the mold of the bowl 102 at the time of manufacture or an add-on accessory purchased after the purchase of the bowl 102. The ear prop 100, 400 also can be adjustable so that it can be used on different sized bowls and/or for different sized pets. As discussed herein, the term "pet" includes all types of animals, not just domesticated animals.

In FIG. 1, the ear prop 100 engages the rim or edge 104 of the bowl 102. The ear prop 100 has members 106, 108 connected to one another through an attachment piece 110. In another embodiment, not shown, the members 106, 108 are not connected to one another through an attachment piece. The members 106, 108 are positioned so that they will be in contact with the pet's ears 112, 112 when the pet 114 places his head 114 in the bowl 102. The members 106, 108 can be set at a predetermined height by the manufacturer or adjusted by the pet's owner; when adjustable, each member 106, 108 may be moved either dependent or independent of the other member. As a result of the members 106, 108, the pet's ears 112, 112 are elevated, supported, or displaced so that they do not come into contact with the food or water in the bowl 102.

In an adjustable embodiment of the ear prop 100, when the ear prop's members 106, 108 are raised and lowered, the attachment piece 110 between the members 106, 108 does not also raise and lower. In an alternative embodiment, the attachment piece 110 between the members 106, 108 also raises and lowers in correlation or proportion to the change in the members 106, 108. In another alternative embodiment, the attachment piece 110 is not present and the members 106, 108 can be adjusted either independently or dependently, i.e., if the members 106, 108 are dependent, when one member is raised or lowered to a specific height, the second member automatically raises or lowers to the same height as a result of a mechanism found inside of the bowl 102; if the members 106, 108 are independent of each other, adjusting one member does not automatically adjust the other member. When raising the members 106, 108, the members 106, 108 move on a diagonal path toward the pet 114; when lowering the members 106, 108, they move on a diagonal path away from the pet 114. In an alternative embodiment, raising and lowering the members 106, 108 results in adjustment of either the vertical or the horizontal distance between the members 106, 108 and the edge 104 of the bowl 102. Raising and lowering the members 106, 108 allows the ear prop to be adjusted based on the size or diameter of the pet's head 116.

When an attachment piece 110 is located between the members 106, 108 of the ear prop 100, the attachment piece 110 can be adjustable so that the ear prop 100 can be used on different shaped or sized bowls. Additionally, although shown as located below the highest portion of the members 106, 108, the attachment piece 110 can be located at a height identical to or higher than the highest portion of the members 106, 108.

Figure 2:
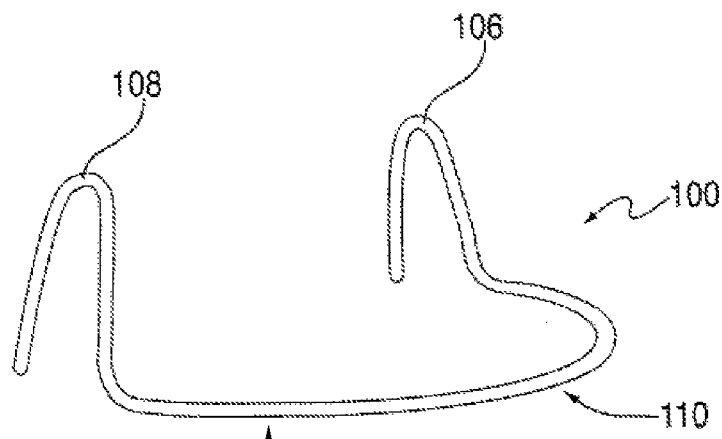
FIG. 2 is a front view of the ear prop of FIG. 1.
Figure 3A:
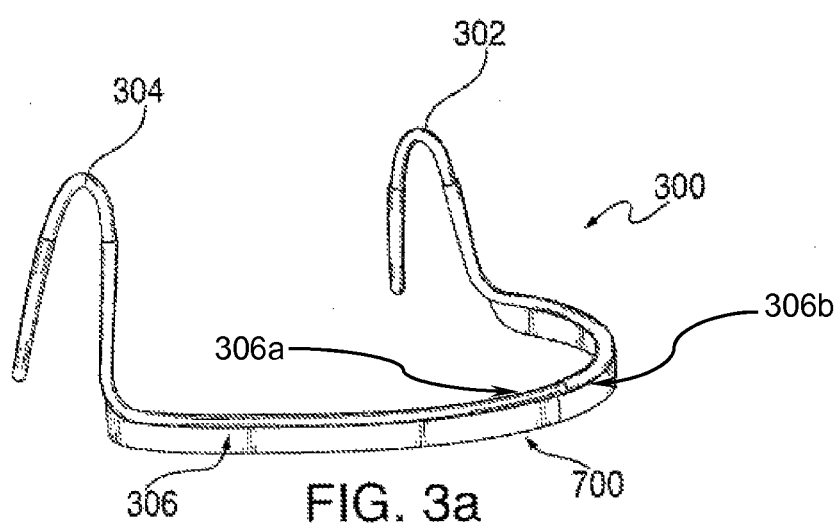
FIG. 3a is a second embodiment of the ear prop of the present invention.
Figure 3B:
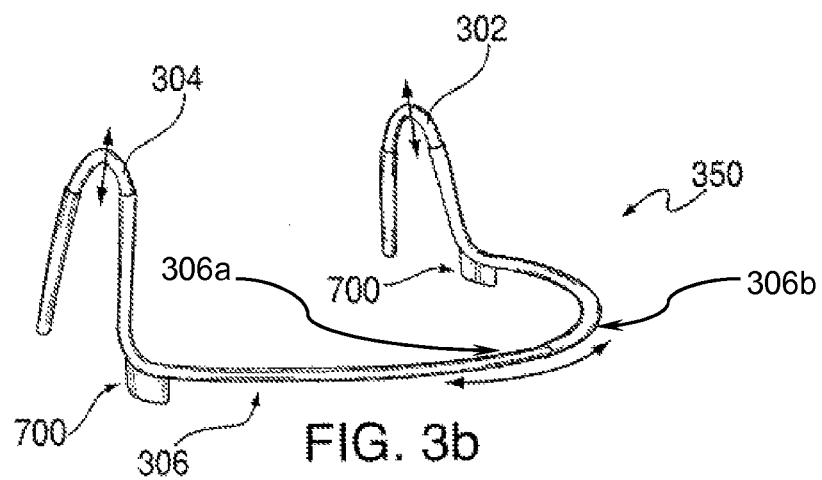
FIG. 3b is a third embodiment of the ear prop of the present invention.

FIGS. 2 and 3 show embodiments of the ear prop of FIG. 1 not operably connected to a bowl. FIG. 2 shows the ear prop 100 having members 106, 108 connected to one another through an attachment piece 110; the members 106, 108 and attachment piece 110 are preset by the manufacturer. Adjustable embodiments are shown in FIG. 3. FIG. 3 shows ear props 300, 350 having adjustable members 302, 304 connected to an adjustable attachment piece 306. In the ear prop 300 shown in FIG. 3a, the members 302, 304 are adjusted dependently or independently relative one another, and the attachment piece 306 is adjusted independently from the members 302, 304. In FIG. 3b, the ear prop 350 has the members 302, 304 and attachment piece 306 dependently adjustable; in other words, manually adjusting member 302, member 304 or attachment piece 306 automatically adjusts the non-manually adjusted items. The attachment piece 306 optionally may comprise at least one telescopic member comprising an inner and outer portion 306a, 306b. The inner and outer portions 306a, 306b may be adjustably position with respect to each other.

Another embodiment of the ear prop is shown in FIG. 4. In this embodiment, the ear prop 400 resembles a shield. The ear prop 400 is located toward and engages the back of the bowl 102. As shown, the ear prop 400 optionally is angled toward the body of the pet 114 which will place its head 116 in the bowl 102 to eat or drink. The ear prop 400 contains members 402, 404. When the pet's mouth is in the bowl 102, the pet's ears 112, 112 are elevated, supported or displaced by the members 402, 404 so that they do not come into contact with the food or water in the bowl 102. The members 402, 404 can be either set at a predetermined height by the manufacturer or adjusted by the pet's owner.

In an adjustable embodiment, when the ear prop's members 402, 404 are raised and lowered, the segment 406 of the ear prop 400 between the members 402, 404 does not also raise and lower. In an alternative embodiment, the segment 406 between the members 402, 404 also raises and lowers in correlation or proportion to the change in the members 402, 404. As shown, the segment 406 between the members 402, 404 is lower than the highest portion of the members 402, 404; alternatively, the height of this segment 406 can be identical to or higher than the highest portion of the members 402, 404. When raising the members 402, 404, the members 402, 404 move on a diagonal path toward the pet 114; when lowering the members 402, 404, they move on a diagonal path away from the pet 114. In an alternative embodiment, raising and lowering the members 402, 404 results in adjustment of either the vertical or the horizontal distance between the members 402, 404 and the edge 104 of the bowl 102.

Figure 5:
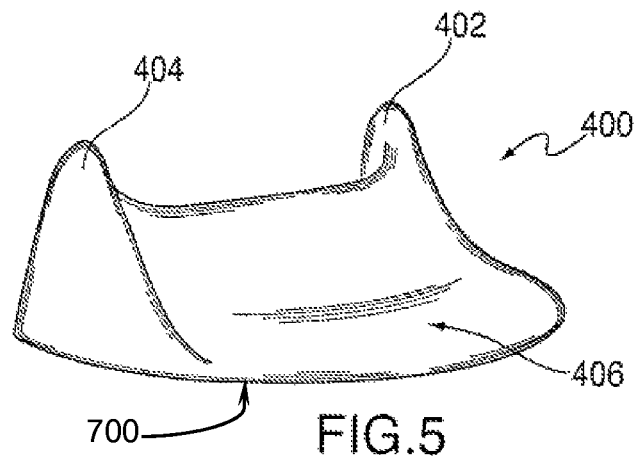
FIG. 5 is a front view of the ear prop of FIG. 4.
Figure 6A:
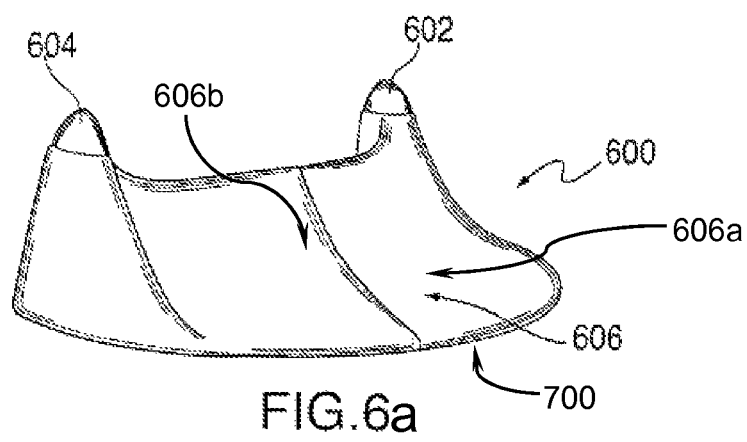
FIG. 6a is a fifth embodiment of the ear prop of the present invention.
Figure 6B:
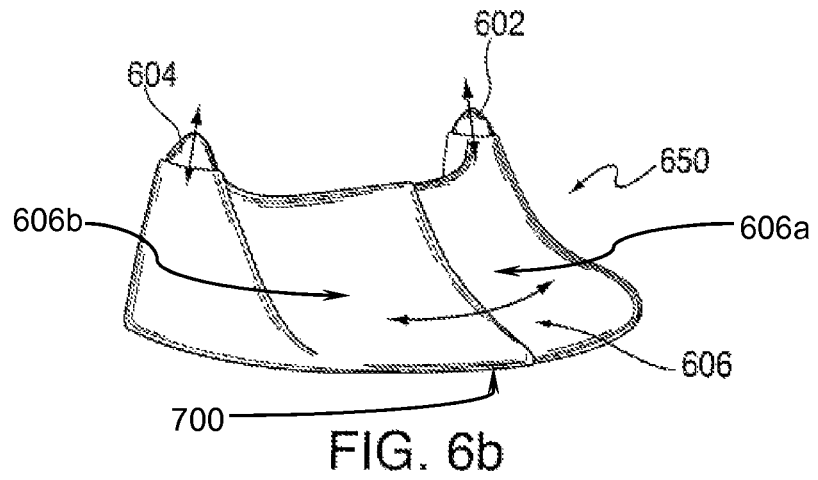
FIG. 6b is a sixth embodiment of the ear prop of the present invention.

FIGS. 5 and 6 show embodiments of the ear prop of FIG. 2 not operably connected to a bowl. FIG. 5 shows the ear prop 400 having members 402, 404 and segment 406 preset by a manufacturer. Adjustable embodiments are shown in FIG. 6. FIG. 6 shows ear props 600, 650 having adjustable members 602, 604 connected to an adjustable segment 606. In the ear prop 600 shown in FIG. 6a, the members 602, 604 are adjusted dependently or independently relative to one another and the segment 606 is adjusted independently of the members 602, 604. As shown in FIG. 6b, the ear prop 650 has the members 602, 604 and the segment 606 dependently adjustable; in other words, manually adjusting member 602, member 604 or segment 606 automatically adjusts the non-manually adjusted items. The segment 606 optionally may comprise at least one telescopic member comprising an inner and outer portion 606a, 606b. The inner and outer portions 606a, 606b may be adjustably positioned with respect to each other.

Although shown as rounded triangular shapes in FIGS. 1-6, the members of the ear prop are not limited to this shape. The shape of the members can be oval, circular, square, rectangular, trapezoidal or any other shape capable of elevating, supporting or displacing a pet's ears. Additionally, the members need not be hollow as shown in FIGS. 1-3 or solid as shown in FIGS. 4-6; the members can be solid, substantially solid, partially solid, hollow, substantially hollow or partially hollow.

Mechanisms for adjusting the adjustable elements described herein are well known in the art. Examples of such mechanisms are snap-lock mechanisms, press-fit mechanisms, bracket-type mechanisms, slide-and-lock mechanisms, twist-and-lock or other friction-fit mechanisms, tongue-and-groove mechanisms, clamp-type mechanisms or any other suitable mechanisms for adjusting the adjustable elements. It also is well known in the art to make adjustable elements operably connected to one another, if so desired.

If the ear prop is an add-on accessory to a bowl or apparatus that holds the bowl, such as a tray, table or the like, the ear prop contains a mechanism 700 to secure it to the bowl or apparatus. The mechanism may be a snap-lock mechanism, a press-fit mechanism, a bracket-type mechanism, a slide-and-lock mechanism, a twist-and-lock or other friction-fit mechanism, a tongue-and-groove mechanism, a clamp-type mechanism or any other suitable mechanism for securing the ear prop to the bowl or apparatus. Alternatively, the ear prop can be a standalone device. In such an embodiment, the members are operably connected to one base or a plurality of bases and the bowl is located in close proximity or is operably connected to the ear prop.

Throughout the description herein, the ear prop has been described as elevating, supporting or displacing a pet's ears so that they do not come into contact with food or water in a bowl. However, this assumes that the ear prop's members are contacting the underside of the pet's ears as shown in FIGS. 1 and 4. The ear prop alternatively could be positioned so that the ear prop's members contact the exterior portions of the pet's ears, in which case the pet's ears would be elevated, supported or displaced so that they do not come or substantially come into contact with the food or water in the bowl.

The ear prop can be made of any suitable material that is substantially rigid so that when the pet's head rubs or presses against the ear prop, the ear prop is able to elevate, support or displace the pet's ears without bending or breaking away from the bowl. Examples of such materials are plastic, wood, rubber, metal, foam or any other suitable material or a combination of such materials. The material chosen may be one that is sufficiently flexible to permit the pet's owner or caregiver to adjust the ear prop to the size of the pet's head or to be in better contact with the pet's ears than the position set by the manufacturer. Optionally, a softer material can be located on or incorporated into the members so that the surface in contact with the pet's ears is softer than the substantially rigid material; examples of softer materials include, but are not limited to, neoprene, microfiber, cotton, felt, or any other suitable material or combinations of these materials.

The ear prop is not limited for use on a bowl. It can be used on a dish or any item from which a pet can eat. Although the ear prop 100, 400 is associated with a round bowl 102 in FIGS. 1 and 4, the item on which the ear prop is used can be any shape; the item need not be circular or oval.

The present invention may be embodied in other specific forms without departing from the spirit or essential attributes thereof and, accordingly, reference should be made to the appended claims, rather than to the foregoing specification, as indicating the scope of the invention.

What is claimed is:

1. An ear prop configured to prevent a pet's ears from contacting or substantially contacting a substance in a bowl or dish, the ear prop comprising:
    a first and second flexible member disposed in a substantially upright plane, the members being spaced apart at a distance corresponding to a distance between the pet's ears so as to elevate, support, or displace the pet's ears;
    an attachment piece extending between and joining the members and being substantially perpendicular to the substantially upright plane, wherein the attachment piece comprises at least one telescopic member comprising an inner and outer portion, the inner and outer portions being adjustably positioned with respect to each other,
    the attachment piece and the members form a substantially saddle-shaped configuration; and
    a mechanism for securing the ear prop to at least one item selected from the group consisting of the bowl or dish, an apparatus that holds the bowl or dish, and at least one base located in close proximity to the bowl or dish.

2. The ear prop of claim 1, wherein the first and second members are operably connected to the bowl or dish.

3. The ear prop of claim 1, wherein the first and second members are operably connected to each other.

4. The ear prop of claim 1, wherein the ear prop is adjustable.

5. The ear prop of claim 1, wherein the ear prop is a shield.

6. The ear prop of claim 1, wherein the pet is a dog.

7. The ear prop of claim 1, wherein the substance comprises food or water.

8. The ear prop of claim 1, wherein the mechanism comprises at least one item selected from the group consisting of a snap-lock mechanism, a press-fit mechanism, a twist-and-lock mechanism, a friction-fit mechanism, a tongue-and-groove mechanism, and a clamp-type mechanism.

9. The ear prop of claim 1, wherein the attachment piece comprises a segment.

10. An ear prop configured to prevent a pet's ears from contacting or substantially contacting a substance in a bowl or dish, the ear prop comprising:
    a first and second flexible member disposed in a substantially upright plane, the members being spaced apart at a distance corresponding to a distance between the pet's ears so as to elevate, support, or displace the pet's ears;
    an attachment piece extending between and joining the members and being substantially perpendicular to the substantially upright plane, wherein the attachment piece comprises at least one telescopic member comprising an inner and outer portion, the inner and outer portions being adjustably positioned with respect to each other,
    the members form peaks along the attachment piece; and
    a mechanism for securing the ear prop to at least one item selected from the group consisting of the bowl or dish, an apparatus that holds the bowl or dish, and at least one base located in close proximity to the bowl or dish.

11. The ear prop of claim 10, wherein the first and second members are operably connected to the bowl or dish.

12. The ear prop of claim 10, wherein the first and second members are operably connected to each other.

13. The ear prop of claim 10, wherein the ear prop is adjustable.

14. The ear prop of claim 10, wherein the ear prop is a shield.

15. The ear prop of claim 10, wherein the pet is a dog.

16. The ear prop of claim 10, wherein the substance comprises food or water.

17. The ear prop of claim 10, wherein the mechanism comprises at least one item selected from the group consisting of a snap-lock mechanism, a press-fit mechanism, a twist-and-lock mechanism, a friction-fit mechanism, a tongue-and-groove mechanism, and a clamp-type mechanism.

18. The ear prop of claim 10, wherein the attachment piece comprises a segment.

19. An ear prop configured to prevent a pet's ears from contacting or substantially contacting a substance in a bowl or dish, the ear prop comprising:
    a shield comprising a first and second flexible member disposed in a substantially upright plane, the members being spaced apart at a distance corresponding to a distance between the pet's ears so as to elevate, support, or displace the pet's ears and a segment extending between and joining the first and second members and being substantially perpendicular to the substantially upright plane, wherein
        the segment comprises at least one telescopic member comprising an inner and outer portion, the inner and outer portions being adjustably positioned with respect to each other;
        the first and second members form peaks along the segment; and
        a mechanism for securing the ear prop to at least one item selected from the group consisting of the bowl or dish, an apparatus that holds the bowl or dish, and at least one base located in close proximity to the bowl or dish.

20. The ear prop of claim 19, wherein the members are operably connected to the bowl or dish.

21. The ear prop of claim 19, wherein the members are operably connected to each other.

22. The ear prop of claim 19, wherein the ear prop is adjustable.

23. The ear prop of claim 19, wherein the pet is a dog.

24. The ear prop of claim 19, wherein the substance comprises food or water.

25. The ear prop of claim 19, wherein the mechanism comprises at least one item selected from the group consisting of a snap-lock mechanism, a press-fit mechanism, a twist-and-lock mechanism, a friction-fit mechanism, a tongue-and-groove mechanism, and a clamp-type mechanism.

26. A dish for holding a substance for a pet constructed to prevent the pet's ears from contacting or substantially contacting the substance, the dish comprising:
    a bowl section having a floor piece with a boundary continuously connectable to a boundary of a side wherein another boundary of the side defines an opening of the dish;
    an ear prop section operably connected to the opening, wherein the ear prop section comprises:
        a first and second flexible member disposed in a substantially upright plane, the members being spaced apart at a distance corresponding to a distance between the pet's ears so as to elevate, support, or displace the pet's ears;

an attachment piece extending between and joining the first and second members and being substantially perpendicular to the substantially upright plane, wherein the attachment piece comprises at least one telescopic member comprising an inner and outer portion, the inner and outer portions being adjustably positioned with respect to each other; and the first and second members form peaks along the attachment piece.

27. The dish of claim 26, wherein the first and second members are operably connected to each other.

28. The dish of claim 26, wherein the ear prop section is separable from the bowl section.

29. The dish of claim 26, wherein the ear prop section is a shield.

30. The dish of claim 28, wherein the ear prop section is a shield.

31. The dish of claim 26, wherein the pet is a dog.

32. The dish of claim 26, wherein the substance comprises food or water.

33. The dish of claim 26, wherein the attachment piece comprises a segment.

\* \* \* \* \*